March 3, 1970     T. J. GAVEN     3,497,966
TEACHING MACHINE

Filed Feb. 20, 1967     5 Sheets-Sheet 2

INVENTORS
THOMAS J. GAVEN

BY *George H. Fritzinger*
AGENT

March 3, 1970  T. J. GAVEN  3,497,966
TEACHING MACHINE

Filed Feb. 20, 1967  5 Sheets-Sheet 3

INVENTORS
THOMAS J. GAVEN

BY George H. Fritzinger
   AGENT

March 3, 1970 T. J. GAVEN 3,497,966
TEACHING MACHINE
Filed Feb. 20, 1967 5 Sheets-Sheet 5

INVENTOR
THOMAS J. GAVEN
BY George H. Fritzinger
AGENT

United States Patent Office 3,497,966
Patented Mar. 3, 1970

3,497,966
TEACHING MACHINE
Thomas J. Gaven, Livingston, N.J., assignor to McGraw-Edison Company, Elgin, Ill., a corporation of Delaware
Filed Feb. 20, 1967, Ser. No. 618,295
Int. Cl. G09b 7/08
U.S. Cl. 35—9         19 Claims

ABSTRACT OF THE DISCLOSURE

An audio-visual teaching machine providing a set course of instruction projects picture frames onto a viewing screen and may supplement each visual presentation with an audio message. Each frame includes an item of instruction projected onto an upper program area of the screen, background information projected onto a pupil's response area of the screen giving the pupil a multiple choice, and light signals projected off the screen according to a binary code. The pupil's response area is covered by a transparent conductive pattern of which a selected portion overlying the correct choice is activated by the coded light signals so that when the pupil touches a conductive pointer to this portion of the screen the machine will advance to a next item of instruction. The coded light signals also determine the mode of operation of the machine, i.e., whether the projector provides a still view of a single frame or a motion picture run and whether the audio machine is operated or not, and if so, whether the audio message is given before or after the pupil's response.

---

The use of a pupil's response window overlaid with a pattern of transparent conductive segments so that the machine can respond to the touching of a manual conductive-type pointing instrument to the area of the window over the correct answer is broadly shown and claimed in the pending application Ser. No. 547,489 of Thomas J. Gaven, filed May 4, 1966, issued Sept. 17, 1968, now U.S. Patent No. 3,401,470.

An object of the present invention is to provide such pupil's response window in the form of a screen having a rear face onto which is projected the pattern, picture or list from a film or slides to enable the pupil to make a selection or choose an answer to the information or instruction given with the use of a pencil form of conductive pointer.

Another object is to provide such teaching machine wherein there is provided a first viewing screen onto which there is projected the information or instruction and a second viewing screen adapted to serve as the pupil's response window.

Another object is to provide the teaching machine with a single viewing screen on an upper portion of which is shown by rearward projection the information and/or instruction and on the lower portion of which is shown by rearward projection the background choice material and on the outer face of which there is provided a pattern of transparent conductive segments to enable the lower portion to serve as a pupil's response window.

Another object is to provide the film or slides with the necessary code information for coordinating the audio machine with the projector and for activating a particular conductive segment on the pupil's response window for each item of information visually shown.

Another object is to provide such teaching machine which can be preset into different modes of operation including audio information before pupil's response, audio information after pupil's response, visual information only with pupil's response, and motion picture runs with or without audio information.

Another object is to provide the machine with a repeat mechanism which is activated recurrently when the machine is in the audio-before-response mode to keep repeating the audio information if the pupil delays in responding to the visual and audio information given.

Another object is to automatically condition the machine to operate according to a preselected one of the aforestated modes in response to a special code signal from the film or slides.

Another object is to provide the machine with apparatus which when the machine is conditioned for audio before pupil's response will record the audio message on a separate machine which will then play back the message at regular intervals so long at the pupil delays in making a proper response.

Another object is to provide the machine with a lesson repeat mechanism which can be activated as with any mode requiring a pupil's response to repeat both the visual and audio information of the lesson from the beginning if the pupil delays inordinately in making a correct response.

Another object is to activate such lesson repeat mechanism automatically when the pupil has made a predetermined number of inaccurate responses.

Other objects and features of the invention reside in the combinations of parts and details of construction hereinafter particularly described and will become apparent from the following description with reference to the accompanying drawings and from the appended claims.

Figure 1:
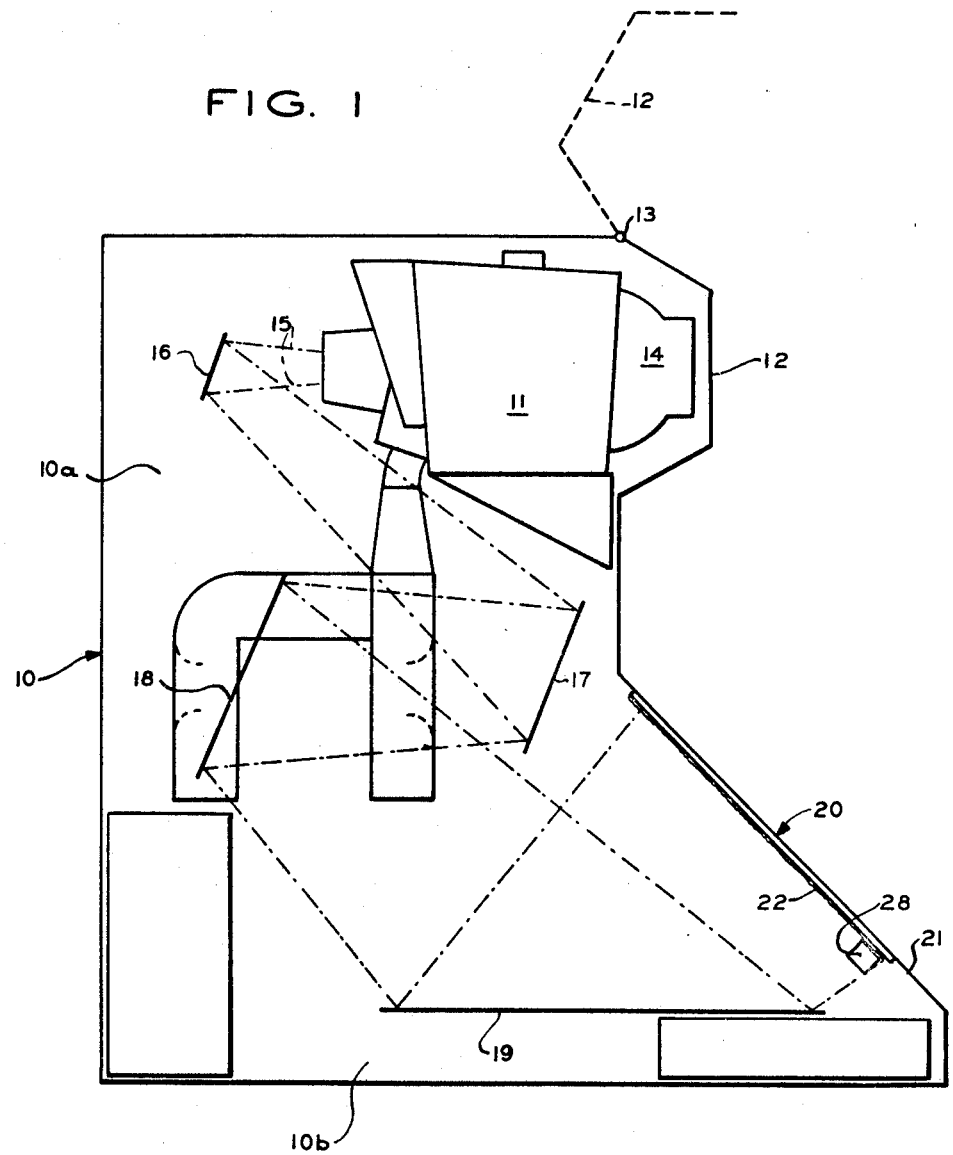
FIGURE 1 is a side elevational view of a teaching machine according to the invention.
Figure 2:
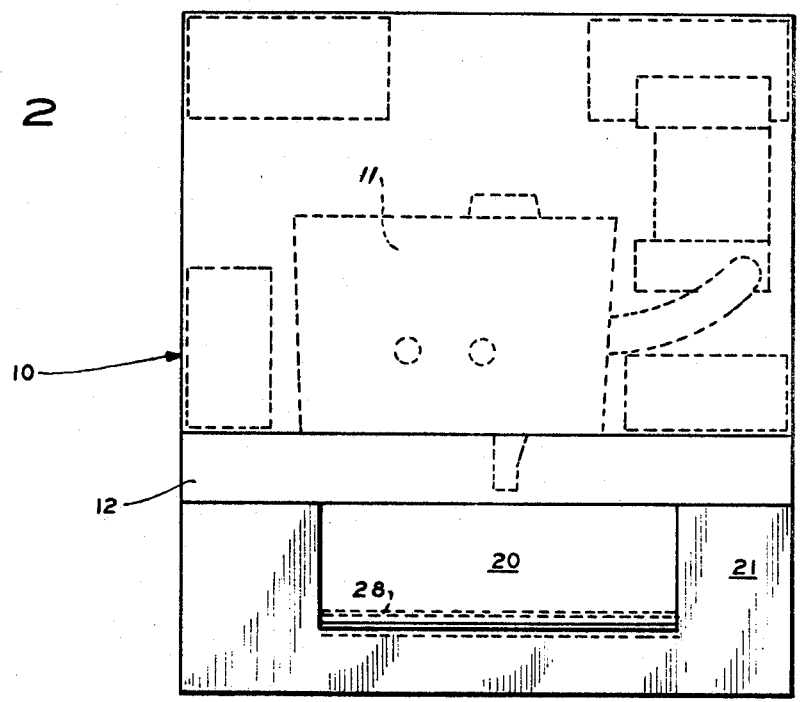
FIGURE 2 is a top plan view of the same machine.
Figure 3:
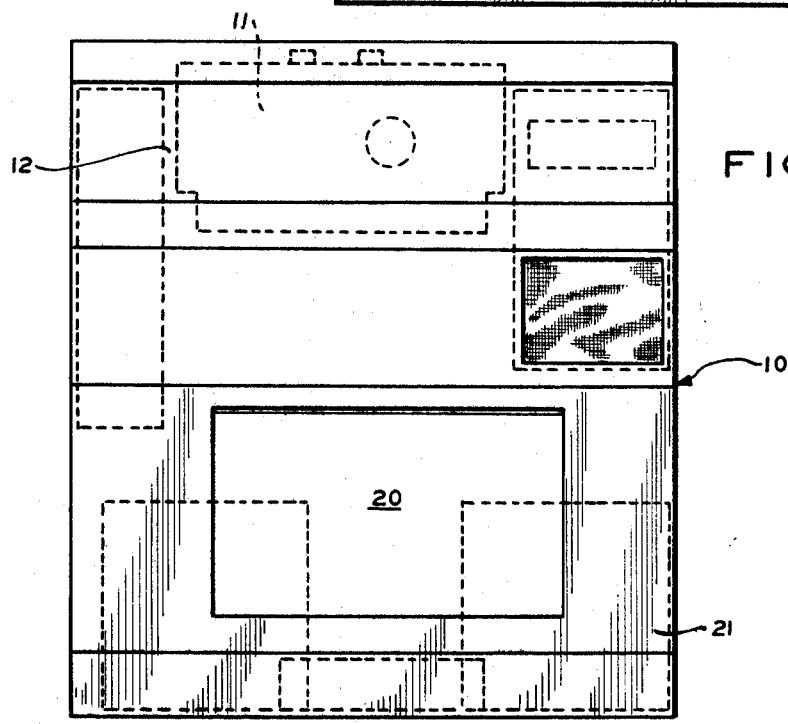
FIGURE 3 is a front elevational view of the same machine.

The present teaching machine comprises a cabinet 10 having an upper section 10a housing a projector 11. A back door 12 can be swung forwardly and upwardly on a hinge 13 to an open position to expose the projector for changing the film cartridge 14. The projector directs a light beam 15 onto a series of mirrors 16, 17, 18 and 19 whereby to project the visual material onto the rear face of a pupil's viewing screen 20. This viewing screen is inset in a downwardly sloping front wall 21 of a lower section 10b of the cabinet. The viewing screen comprises a glass window having a coating 22 of rear screen projecting material such as of ground glass so that pictures can be projected rearwardly thereon.

Figure 4:
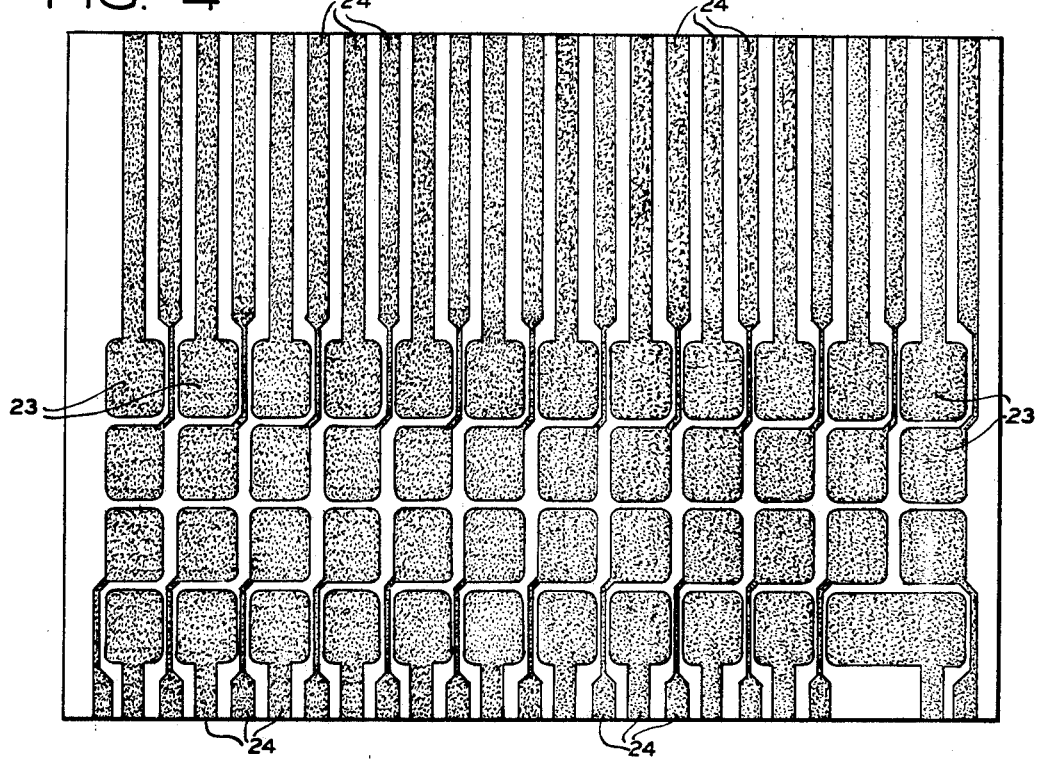
FIGURE 4 is a view depicting the pattern of the transparent conductive segments and lead-out connector paths on the front face of the pupil's response window.
Figure 5:
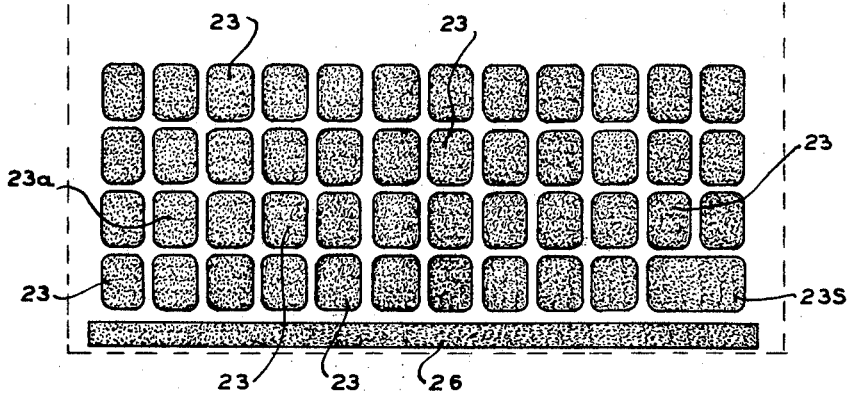
FIGURE 5 is a view depicting the invisible conductive areas which are left exposed on the front face of a pupil's response window after an insulating transparent glass film is selectively applied thereon.
Figure 6:
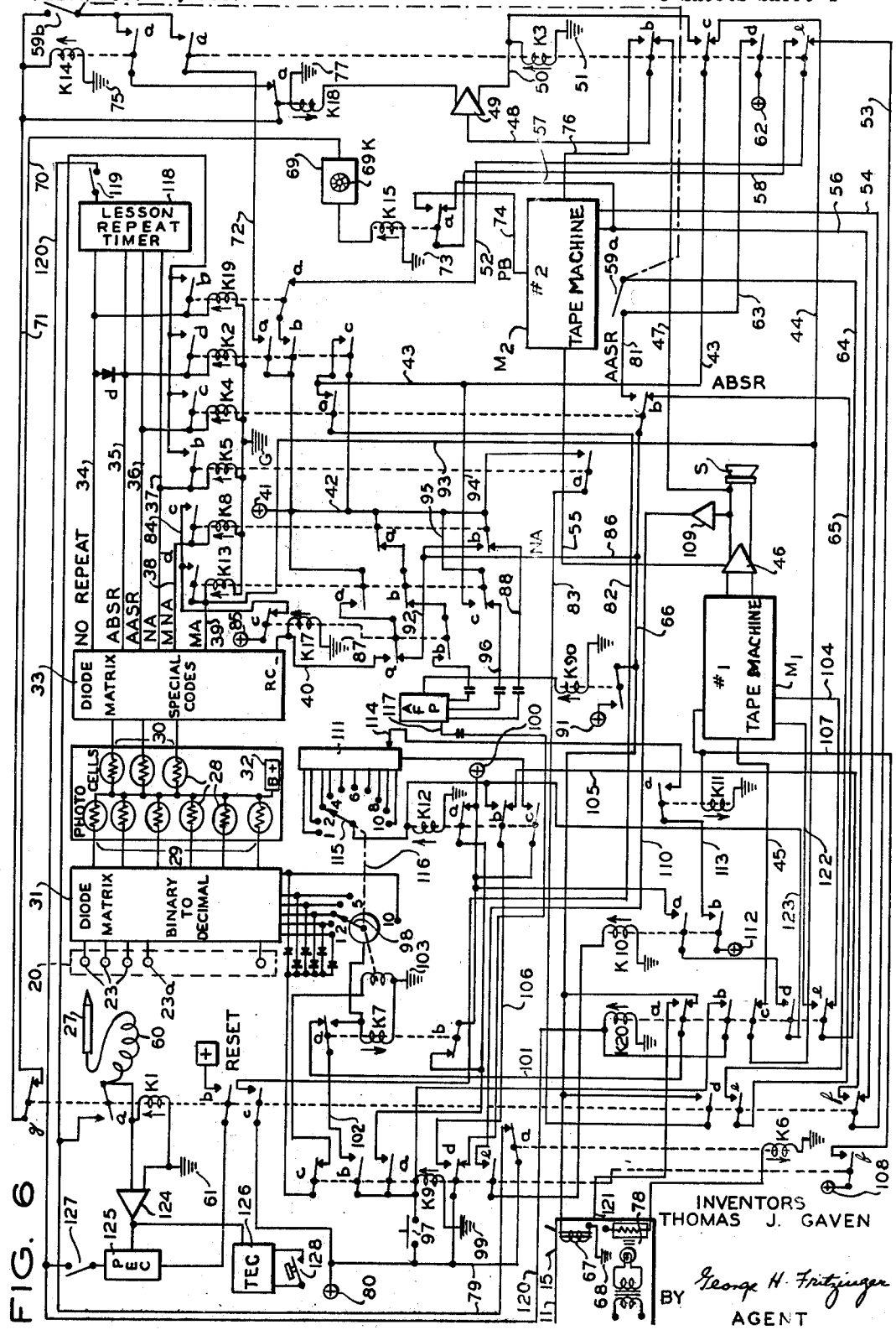
FIGURE 6 is a schematic circuit diagram of the machine.

On the front face of the window there is provided an invisible conductive film of tin oxide which is etched away to form a predetermined pattern of individual conductive segments 23 each having a narrow connector path 24 leading out the top or bottom edges of the window as is illustrated in FIGURE 4. In the illustrative pattern as shown the segments 23 are rectangular areas confined to the lower half portion of the window and arranged in four different rows according to the keyboard of a typewriter. One of the conductive segments 23s is of a wide rectangular form to simulate the space bar of a typewriter. All of the top surface of the window except the conductive areas 23 is provided with a transparent insulative coating as of glass so that all of the connector paths 24 are insulated leaving exposed only the areas or segments 23 for conductive contact. Thus, in the final form the viewing window has exposed invisible conductive segments 23 only as are depicted in FIGURE 5. There are however bands 25 and 26 along the top and bottom portions of the window which are covered by the front wall 21 of the machine but which are not covered by the glass film so that lead wire connections can be made as by soldering to the lead out connector paths of the respective conductive segments 23.

Figure 7:
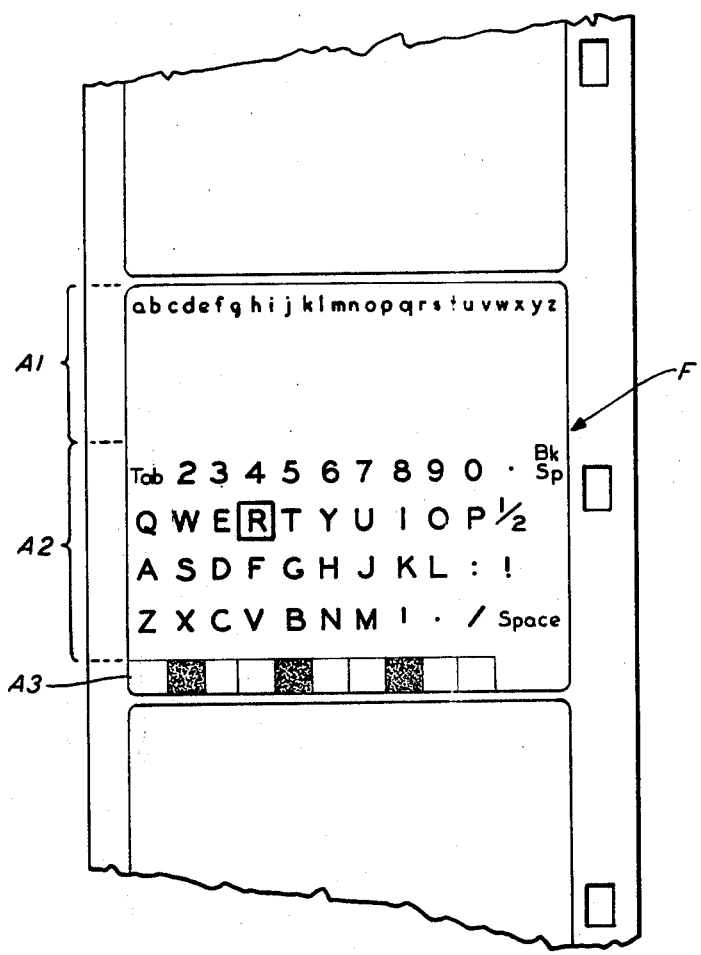
FIGURE 7 is a view of a portion of the film showing a single frame comprising a program area, a pupil's response area and a code signal area.

As will appear, the conductive segments 23 are activated selectively—i.e., connected to a source of potential—by code signals taken from the frames or slides which are projected on the screen. When the pupil touches the activated segment with a conductive pencil-type pointer 27 as an incident to pointing out the correct answer of the several choices projected on the screen, the machine is triggered into a response whereupon it advances to a next presentation. When the conductive pattern is confined to the lower portion of the screen as shown, the blank upper portion is utilized for visually showing the successive items of information or instruction or for presenting questions, and the lower portion except for a bottom code area is utilized as a pupil's response area on which a background choice material is projected with only the conductive segment overlying the correct choice being activated. For example, in the illustrative frame shown in FIGURE 7, there is a frame F having an upper program area A1, a next lower pupil's response area A2 and a bottom code area A3. Thus, the machine will not respond except when the correct choice is pointed out by the pupil touching the pointer 27 to the area of the window overlying the correct choice. The visual presentation over the pupil's response area may take any one of many forms such, for example, as a listing of multiple choice answers, numbers or letters as shown in FIGURE 7, a clock face, a map, a field of animals, etc., wherein an activated segment 23 overlies the one correct item to be selected by the pupil. At the bottom of the screen 20 back of the front wall 21 is a row of photocells 28 comprising one group 29 of six photocells for activating selectively the forty-seven conductive segments 23 and a group of ten terminals of a scan switch 98 hereinafter described, and another group 30 of three photocells for selectively activating respective circuits 34–40 to place the machine in its different modes of instruction hereinbefore mentioned. The photocells are activated by the light beam 15 from the projector through a coding on the film or slides comprising a black opaque border on each frame or slide F (FIGURE 7) having light pervious spots of a number and spacing to activate the photocells singly or in predetermined combinations. The photocells 28 of group 29 are connected through a diode matrix 31 to connect B+ terminal 32 to the respective conductor segments 23 or the terminals of the scan switch 98 according to the coding on the respective frames or slides. Further the photocells 28 of the group 30 are activated selectively by special coding on the frames or slides to connect the B+ terminal 32 through a diode matrix 33 selectively to the mode control circuits 34–40.

Let it be assumed that the first frame of the film projected on the screen has a special code on its border area for activating the mode circuit 35. This conditions the machine to cause the audio message to be played before the pupil's response, say to select the A key, and to keep repeating the message at regular intervals if the pupil delays. Further, let it be assumed that the film frame projects a series of letters on the upper portion of the screen, that it projects the characters of a typewriter keyboard on the lower portion of the screen in accordance with the location of the conductive segments 23, and that the regular code in the border area of the film is one to activate the conductor segment 23a overlying the A key. The circuit 35 will therefore operate a relay $K_2$ through ground G. As the relay $K_2$ is operated its switch $d$ is closed to provide a hold circuit via switch $a$ of relay $K_6$, lead 79 and plus terminal 80. Also, as soon as the relay $K_2$ is operated its switch $c$ is closed to connect plus terminal 41 via lead wire 42, switch $c$ of relay $K_2$, lead 43, lower contact of switch $c$ of relay $K_3$, lead 44, switch $c$ of relay $K_{20}$ and playback circuit 45 of audio tape machine $M_1$. This starts the audio machine $M_1$ running in normal playback through amplifier 46 and speaker S. The tape of machine $M_1$ is prerecorded to conform with the visual material projected on the screen and will now pronounce the letter A. Also, prerecorded on the tape following the pronunciation of the letter A is a sub audio control signal, say of 20 c.p.s., which is picked up by the machine $M_1$, amplified by the amplifier 46 and fed via lead 47, lower contact of switch $b$ of relay $K_3$, lead 48, 20 c.p.s. tone detector 49, lead 50 and relay $K_3$ to ground 51. The resultant operation of relay $K_3$ breaks its switch $c$ lower contact to stop the audio tape machine $M_1$. Also, the making of switch $c$ upper contact of relay $K_3$ provides it with a hold circuit from plus terminal 41 via switch $c$ of relay $K_2$.

When the relay $K_2$ is operated, a repeat audio machine $M_2$ is started at a slow record speed simultaneously as the machine $M_1$ is started by a circuit running from plus terminal 41 via switch $b$ of relay $K_2$, switch $a$ of relay $K_{19}$, lead 52, switch $e$ lower contact of relay $K_3$, lead 53, switch $f$ lower contact of relay $K_1$ and a start lead 54 of the machine $M_2$. This machine has an audio input lead 55 connected to the output of the audio machine $M_1$ to record the audio message therefrom and the control signals at the end of each message. When the relay $K_3$ is operated by the control signals from the audio machine $M_1$ the audio machine $M_2$ is also stopped by the opening of switch $e$ lower contact of relay $K_3$. Simultaneously, a fast speed return circuit 56 for the audio machine $M_2$ is activated via the lead 57, switch $a$ lower contact of relay $K_{15}$, lead 58, switch $e$ upper contact of relay $K_3$ and lead 52 back to the plus terminal 41. The audio machine $M_2$ then snaps back to home position to ready itself for a repeat playback of the message taken from the audio machine $M_1$. When the repeat machine $M_2$ is returned home it closes home switches 59a and 59b.

If the pupil touches next the conductor pencil 27 to the activated segment 23a overlying the A key, the relay $K_1$ is operated from the B plus terminal 32 via terminal 23a, pencil 27, flexible lead wire 60, relay $K_1$ and ground 61. Operation of the relay $K_1$ closes its switch $a$ to provide a hold circuit via the switch $a$ of the relay $K_6$, lead 79 and plus terminal 80. Also, operation of the relay $K_1$ while the relay $K_3$ is held operated and the home switch 59a is closed causes the projector 11 to be activated to advance the film by one frame, the activating circuit being from plus terminal 62 via switch $d$ of relay $K_3$, lead 63, home switch 59a, lead 64, switch $e$ of relay $K_1$, lead 65, switch $b$ lower contact of relay $K_4$, lead 66, solenoid 67 and ground 68. The film is therefore advanced by one frame to present a new item of instruction on the screen 20.

If the pupil responds by touching the pencil 27 to the correct conductive segment 23a before the audio machine $M_1$ has completed its message and operated the relay $K_3$, the relay $K_1$ is operated the same as before. This does not stop the audio machine $M_1$ from playing the full message but it does intercept the circuit 54 to stop and snap back the audio machine $M_2$ by reason of the switch $f$ of relay $K_1$ breaking with its lower contact and by then activating the fast reverse circuit of the audio machine $M_2$ via lead 56, switch $f$ upper contact of relay $K_1$, lead 53, switch $e$ lower contact of relay $K_3$ and lead 52 back to the plus terminal 41. This immediate return of the audio machine $M_2$ is carried out because there is no need remaining for a repeat operation after the pupil has made a correct selection. As soon as the audio machine $M_1$ finishes the playback of its message the projector 11 is activated to advance the film to the next frame.

If the pupil delays unduly in making a correct response after the audio message has been played, the repeat machine $M_2$ which now stands ready to play back the same audio message is started. The repeat playback of the audio message is through the input-output circuit 55 and the speaker S. The control of the repeat audio machine $M_2$ is by an audio repeat timer 69. This timer is started when the relays $K_2$ and $K_3$ are operated while the repeat audio machine $M_2$ is in home position, the start circuit being via lead 70, switch $g$ of relay $K_1$, lead 71, home switch 59b of audio machine $M_2$, switch $a$ of relay $K_3$, lead 72, switch $a$ of relay $K_2$ and plus terminal 41. After a preset time which is adjustable by a knob 69k, say a time of five to ten seconds, the timer 69 completes a circuit from the lead 70 to the relay $K_{15}$ causing this relay to be operated from plus terminal 41 through switch $a$ of relay $K_2$, switch $a$ of relay $K_3$, home switch 59b, switch $g$ of relay $K_1$, timer 69 and relay $K_{15}$ to ground 73. The relay $K_{15}$ closes its switch $a$ with its upper contact to connect a playback circuit 74 of the repeat machine $M_2$ via lead 58, switch $e$ of relay $K_3$, switch $a$ of relay $K_{19}$ and switch $b$ of relay $K_2$ to plus terminal 41. This starts the machine $M_2$ in playback to repeat the audio message. Although the home switch 59b is opened the instant the repeat machine leaves home, a prior operation of relay $K_{14}$ from plus terminal 41 via switch $a$ of relay $K_2$, switch $a$ of relay $K_3$, home switch 59b and relay $K_{14}$ to ground 75 has caused switch $a$ of relay $K_{14}$ to be connected across the home switch 59b via switch $a$ of relay $K_{18}$ to keep the relay $K_{15}$ activated after the home switch 59b is opened.

If the pupil does not respond by touching the pencil 27 to the right conductive segment 23a while the repeat machine $M_2$ is running, the repeat machine completes the audio message and then feeds out the control signal on the line 76 through the switch $b$ upper contact of relay $K_3$, lead 48, tone detector 49 and relay $K_{18}$ to ground 77. Although this control signal is fed also to the relay $K_3$ this is without effect because this relay is already operated. The relay 18 is thus momentarily operated to open its switch $a$ and drop the relay $K_{14}$. The opening of this switch also breaks the shunt circuit around the home switch 59b to reset the timer 69 and drop the relay $K_{15}$. The dropping of the relay $K_{15}$ closes its switch $a$ at its lower contact to reconnect the fast reverse circuit of the repeat machine $M_2$ to the plus terminal 41 via lead 57, switch $a$ lower contact of relay $K_{15}$ and switch $e$ of relay $K_3$. The repeat machine $M_2$ is thereupon returned home to close again the home switch 59b. The reclosing of the home switch 59b immediately reactivates the relay $K_{14}$ via the switch $a$ of relay $K_3$ and the plus terminal 41. The reactivation of relay $K_{14}$ again starts the timer 69 running to again operate the relay $K_{15}$ after a predetermined interval the effect of which would be to start again the audio machine $M_2$ to play back the audio message. Thus, the repeat audio machine $M_2$ will keep replaying the audio message until the pupil makes the correct selection by touching the pencil 27 to the activated one of the conductive segments 23.

When the pupil does make the correct selection, the relay $K_1$ is operated to open its switch $g$ to drop the timer 69. As before, this starts the machine $M_2$ in fast rewind, but when it reaches home position this time the closure of the home switch 59a while the relay $K_1$ is operated activates the projector 11 from the plus terminal 62 via switch $d$ of relay $K_3$, home switch 59a, lead 64 of switch $e$ of relay $K_1$, lead 65, switch $b$ lower contact of relay $K_4$, lead 66, solenoid 67 and ground 68. This activation of the projector causes the film to be advanced by one frame. Each time the projector so advances the film by one frame a lamp shutter and photocell arrangement 78 operates a relay $K_6$ to open its switch $a$ in the supply line 79 from the plus terminal 80 whereby to drop the mode relay $K_2$ and the relay $K_1$ and thereby limit the advance of the film to a single frame.

There may also be a special code for audio before pupil's response without repeat of the audio if the pupil delays in making a correct response. This special code will activate the line 34 and will also activate the relay $K_2$ through the diode $d$; also, it will activate the relay $K_{19}$. The activation of the relay $K_2$ provides the audio before pupil's response as before described but the activation of the relay $K_{19}$ opens at its switch $a$ the circuits by which the audio machine $M_2$ and the repeat timer 69 are controlled to cut off the audio repeat function.

If the special code on the frame to be projected onto the screen 20 is one to cause the audio after the pupil response then the mode line 36 will be activated from the B+ terminal 32 via the photocell group 30 and the diode matrix 33. Activation of this mode line will activate the mode relay $K_4$. Once the relay $K_4$ is operated its switch $c$ is closed to provide a hold circuit from the plus terminal 80 via lead 79, switch $a$ of relay $K_6$ and ground G. Operation of the relay $K_4$ also shifts its switch $b$ from lower to upper contact to shift the frame advance circuit 66 of the projector 11 to the lead 81. The lead 81 is conected via lead 63 to switch $d$ of relay $K_3$ causing the machine to await the pupil's response.

Say the frame now being shown projects the letter B in the upper part of the screen and that the code now activates the pupil's conductive segment above the B key of the typewriter keyboard projected on the lower part of the screen. When the pupil touches the pencil 27 to the conductive segment 23b (FIGURE 5), the relay $K_1$ is activated from the B+ terminal 32 and is then held operated from the plus terminal 80, the same as before. This starts the audio machine $M_1$ in playback by activating the lead 45 via switch $a$ of relay $K_{20}$, lead 44, switch $c$ lower contact of relay $K_3$, lead 43, switch $a$ of relay $K_4$, lead 82, switch $c$ of relay $K_1$ and plus terminal 80. The audio machine $M_1$ runs to pronounce the letter B and then to reproduce the sub audio control signal at the end of the audio message. The control signal operates the relay $K_3$, the same as before. Operation of the relay $K_3$ opens the control circuit 45 of the audio machine $M_1$ at switch $c$ of relay $K_3$ to stop the audio machine, and it closes switch $d$ of relay $K_3$ to connect a plus terminal 62 to the frame advance circuit 66 of the projector to advance the film by one frame. Again, incidental to the frame advance the lamp shutter and photocell arrangement 78 operates the relay $K_6$ to drop the mode relay $K_4$ and the relay $K_1$ whereby to stop the projector after one frame advance.

If the special code on the frame being shown on the screen 20 is one which does not activate the audio machine, the line 37 is connected to B+ terminal 32 via the photocell group 30 and diode matrix 33 to activate the mode relay $K_5$. The relay $K_5$ is then locked over its hold circuit by its switch $b$, lead 79, switch $a$ of relay $K_6$ and plus terminal 80. When the pupil touches the conductor pencil 27 to the conductor segment 23 which has been activated by the code on the frame being shown, the relay $K_1$ is activated to advance the film by one frame, the activation being via circuit 66, switch $d$ of relay $K_1$, lead 83, switch $a$ of relay $K_5$ and plus terminal 41. As the frame is advanced the relay $K_6$ is again activated to drop the mode relay $K_5$ and the relay $K_1$ to stop the projector after one frame advance.

If the special code on the frame to be projected on the screen in one for showing motion with no audio, the line 38 is activated from the B+ terminal 32 to operate a mode relay $K_8$. As the relay $K_8$ is operated it receives a hold circuit via its switch $c$, lead 84, switch $c$ of relay $K_{17}$ and plus terminal 85. The projector circuit 66 is now connected via lead 86 and switch $b$ upper contact of relay $K_8$ to plus terminal 41 to cause the projector to run continuously until a frame is reached having a stop code thereon. Such stop code will activate the relay $K_{17}$ from the B+ terminal 32 and ground 87. Operation of the relay $K_{17}$ opens its switch $c$ disconnecting relay $K_8$ from plus terminal 85 and dropping the relay to stop the projector. However, to avoid the projector from coming to standstill on a stop code, the dropping of the relay $K_8$ is caused to advance the film by a single frame. This advance is accomplished by feeding a pulse from plus terminal 41 via switch $b$ lower contact of relay $K_8$ and lead 88 to a pulse relay 90 which as it is operated momentarily connects plus terminal 91 to the frame advance circuit 66.

When a special code is received for motion and audio the line 39 is connected to the B+ terminal 32 to activate the relay $K_{13}$. Operation of the relay $K_{13}$ closes its switch $d$ to provide a hold circuit from plus terminal 85 via switch $c$ of relay $K_{17}$. This connects the frame advance solenoid 67 via lead 66, 86 and 92, switch $a$ lower contact of relay $K_{17}$ and switch $a$ of relay $K_{13}$ to the plus terminal 41, causing the projector to run continuously. However, the audio machine $M_1$ is now also started from the lead 45 over switch $a$ of relay $K_{20}$, lead 46, lead 93, switch $d$ of relay $K_{13}$, switch $c$ of relay $K_{17}$ and plus terminal 85. The audio machine $M_1$ continues to run until a sub audio control signal is fed out to relay $K_3$ to operate the relay and stop the audio machine. Also, the projector continues to run until it receives a special stop code to operate the relay $K_{17}$. When the relay $K_{17}$ is so operated its switch $a$ lower contact is broken to stop the projector.

If the stop code is received to operate the relay $K_{17}$ before the audio machine is stopped, the relay $K_{17}$ obtains a hold circuit via its switch $a$ upper contact, switch $a$ of relay $K_{13}$ and plus terminal 41. Operation of relay $K_{17}$ breaks the hold circuit for relay $K_{13}$ from plus terminal 85 but the relay $K_{13}$ stays operated over lead 93, lead 44, switch $c$ lower contact of relay $K_3$, lead 43, lead 94, switch $c$ upper contact of relay $K_{13}$ and plus terminal 41. When the audio machine feeds out a sub audio control signal to operate the relay $K_3$, the relay $K_{13}$ is dropped. The dropping of the relay $K_{13}$ sends a pulse from plus terminal 41, lead 95, switch $c$ lower contact of relay $K_{13}$ and leads 42 and 96 to the pulse relay 90. The momentary operation of this relay connects plus terminal 91 to the solenoid 67 to advance the film by one frame.

If the sub audio control signal is received before the stop code signal, the relay $K_3$ is operated to stop the audio machine but the relay $K_{13}$ is not dropped since it is locked over switch $c$ of relay $K_{17}$ and plus terminal 85. When the relay $K_{17}$ is later operated momentarily by a stop code signal, it opens switch $c$ to drop relay $K_{13}$ and it feeds a pulse from plus terminal 41 over switch $a$ of relay $K_8$, switch $b$ of relay $K_{13}$ nd switch $b$ of relay $K_{17}$ to operate the relay $K_{90}$ momentarily and feed a pulse to activate the solenoid 67 whereby to advance the film by one frame.

The present teaching machine has the feature that it can be started in a scan condition by pressing a scan switch 97. When this switch is pressed the machine will scan along the length of the film of the projector to any of ten different preselected points or lessons and will scan simultaneously along the tape of the audio machine $M_1$ to any of ten different corresponding points. Each scan stop signal may be recorded at ten cycles per second but since the tape speed during scanning is faster, say fifteen times, than the normal playback speed these scan control signals would be picked up at 150 c.p.s. Each scan point is selected by setting a scan switch 98 to any of ten different positions. The film is provided on the last frames of the respective lessons with ten different special codes which are different from the codes for activating the conductor segments and the mode control circuits. Although each stop control signal on the tape at the end of each lesson is identical the scan stop signals are of a different frequency from the stop control signals before described at the end of the respective audio messages.

Say the scan knob 98 is set at its number three position and that the scan switch 97 is then pressed closed. This operates the relay $K_9$ from plus terminal 80 and ground 99 to provide the relay $K_9$ with a hold circuit via its switch $a$ and via switch $b$ of relay $K_7$ and switch $a$ of relay $K_{12}$ in parallel to plus terminal 100. This starts projector 11 running over switch $a$ lower contact of relay $K_{20}$, lead 101, switch $a$ upper contact of relay $K_7$, lead 102, switch $b$ of relay $K_9$ and the hold circuit of this relay just described. The projector runs until it picks up the special code signal at its number three scan point. At this point connection is made from B+ terminal 32 to operate relay $K_7$ via photocell group 29, diode matrix 31, scan switch 98 third position and relay $K_7$ to ground 103. Operation of the relay $K_7$ breaks its switch $a$ upper contact to stop the projector. The operation of the relay $K_9$ also started the audio machine $M_1$ running forward at fast speed (15 times normal) by connecting the circuit 104 of the audio machine $M_1$ to + terminal 80 via switch $e$ lower contact of relay $K_{20}$, lead 105, switch $b$ lower contact of relay $K_{12}$, lead 106 and switch $d$ upper contact of relay $K_9$. Relay $K_{11}$ is operated responsive to audio machine $M_1$ being in home position when the fast forward circuit 104 was energized, and is locked over lead 107, switch $f$ of relay $K_9$ and plus terminal 108. As the tape of the machine $M_2$ is moved fast forward each scan signal picked up from the tape is fed via a 150 c.p.s. scan tone detector 109, lead 110, and switch $e$ of relay $K_9$ to pulse relay $K_{10}$. Each operation of relay $K_{10}$ feeds a current pulse to a ring counter 111 from plus terminal 112 via switch $b$ of relay $K_{10}$, lead 113, switch $a$ of relay $K_{11}$ and lead 114. Upon each activation of the ring counter the plus terminal 112 is connected to the next one of the terminals of the ten position switch 115. The pole member of this switch has a mechanical tie line connection 116 with the scan switch 98 and stands therefore also in the number three position. When the audio machine $M_1$ reproduces the third scan control signal the plus terminal 112 is connected via the switch 115 to the relay $K_{12}$. Operation of the relay $K_{12}$ breaks the fast forward circuit 104 of the audio machine $M_1$ at switch $b$ lower contact of relay $K_{12}$ to stop the machine. At the same time the ring counter is reset via lead line 116, switch $c$ of relay $K_{12}$ and plus terminal 100. Also, when the relay $K_{12}$ is operated its switch $a$ is open to drop the relay $K_9$ and the switch $f$ of the relay $K_9$ is thereupon opened to drop the relay $K_{11}$.

Should the tape reach the selected scan point before the film reaches its corresponding point, the relay $K_{12}$ is operated via the ring counter and is locked over its switch $b$ upper contact, switch $d$ upper contact of relay $K_9$ and plus terminal 100. Operation of the relay $K_{12}$ opens its switch $b$ lower contact to stop the audio machine. The audio machine now awaits the projector to arrive at the corresponding scan point on the film. When the projector reaches the same point, the relay $K_7$ is operated as before described and it in turn drops the relay $K_9$. (Note that both relay $K_7$ and $K_{12}$ must be operated to drop the relay $K_9$.) As the relay $K_9$ is dropped, the switch $d$ lower contact is closed to feed a pulse from the plus terminal 80 via the lead 117 to operate the relay $K_{90}$ momentarily. This feeds a pulse from the plus terminal 91 to the frame advance solenoid 67 to advance the film by one frame.

Each lesson presented to the pupil—which may comprise a series of separate visual items and of corresponding audio messages—may be repeated regardless of how far the student has progressed therethrough if (1) the pupil takes too long to respond, or (2) makes too many mistakes. For instance, when any of the modes controlled by lines 34 to 39 is activated, it starts also a lesson repeat timer 118. If the lesson repeat switch 119 is closed a relay $K_{20}$ is operated after a predetermined interval via a lead 120. Operation of the relay $K_{20}$ closes its switch $b$ to operate also relay $K_9$ causing both relays $K_{20}$ and $K_9$ to lock over switch $b$ of relay $K_7$ and switch $a$ of relay $K_{12}$. Operation of relay $K_{20}$ closes a rewind circuit 121 of the projector 11 via switch $a$ upper contact of relay $K_{20}$, lead 101, switch $a$ upper contact of relay $K_7$, switch $b$ of relay $K_9$ and the hold circuit of relay $K_9$. The projector runs in reverse until the previously detected special code is again detected to operate the relay $K_7$.

The operation of relay $K_{20}$ by the lesson repeat timer closes its switch $e$ upper contact to also activate a rewind circuit 122 of the audio machine $M_1$ via lead 105, switch $b$ lower contact of relay $K_{12}$, lead 106, switch $d$ upper contact of relay $K_{12}$ and plus terminal 80. When during the rewinding the audio machine picks up the first scan control signal marking the start of the lesson in progress, the relay $K_{10}$ is operated via the detector 109, lead 110 and switch $e$ of relay $K_9$. Operation of the relay $K_{10}$ now operates the relay $K_{12}$ because the relay $K_{20}$ is standing operated from plus terminal 100 via switch $a$ of relay $K_{10}$, switch $d$ of relay $K_{20}$ and lead 123. When the relay $K_{12}$ is operated it locks over its switch $b$ upper contact, switch $d$ of upper contact $K_9$ and plus terminal 80. Operation of relay $K_{12}$ opens its switch $b$ lower contact to stop the rewind of the audio machine.

When both relays $K_7$ and $K_{12}$ are operated, the relays $K_9$ and $K_{20}$ are dropped. As the relay $K_9$ is dropped it sends a pulse via switch $b$ lower contact to advance the projector by one frame. As the relay $K_{20}$ is dropped, its switch $a$ is closed to activate the playback circuit 45 of the audio machine $M_1$. The machine is therefore ready to make a repeat presentation of the audio part of the lesson.

The same repeat sequence takes place if the pupil makes too many mistakes. For example, as the pupil touches the pointer 27 to each wrong conductor segment 23, the minimum current the photocells 28 are passing will activate a detector 124 and trigger a preset error counter 125 as well as a total error counter 126. When the preset number of errors is reached, and if the error switch 127 is closed, the relay $K_{20}$ is operated via line 120 to start the lesson repeat sequence as above described. The preset error counter 125 is reset by switch $b$ of relay $K_1$ each time the relay $K_1$ is operated responsive to touching the pointer 27 to a correct segment 23. The total error counter 126 is reset by pressing a button 128. The opening of switch 127 turns off the error counter.

The embodiment of my invention herein particularly shown and described is intended to be illustrative and not necessarily limitative of my invention, since the same is subject to changes and modifications without departure from the scope of my invention, which I endeavor to express according to the following claims.

I claim:

1. In a teaching machine: the combination of a pupil's information screen, a supply of picture frames bearing items of instruction, a projector selectively operable for showing respective items of instruction onto said screen by projecting an individual frame for still viewing or by projecting a series of frames in a motion picture run, a frame for each item of instruction having a code area for projecting coded light signals according to a binary code, an audio machine having a prerecorded medium for playing audio messages related to selected items of instruction shown by said projector, a pupil's response device selectively operable to make a predetermined choice relative to the respective items of instruction shown by said projector, and conditioning means controlled by the coded light signals and operatively connected to said audio machine and said projector for controlling the starting of said audio machine and the timing of the starting thereof relative to the pupil's operation of said response means and for concurrently conditioning said projector for still showing of an individual frame or for showing a series of frames in a motion picture run.

2. The teaching machine set forth in claim 1 wherein said conditioning means is placeable in a condition for causing said audio machine to be activated to provide an audio message simultaneously as an intem of instruction is projected onto said information screen, means for repeating the audio message related to the item of instruction shown, and timing means for activating said repeating means when the pupil delays by more than a predetermined interval in making said choice.

3. The teaching machine set forth in claim 2 wherein said conditioning means is selectively operable by said coded light signals to activate the audio machine before a pupil's response with or without operation of said repeating means if the pupil delays said predetermined interval in making said choice.

4. The teaching machine set forth in claim 1 wherein said conditioning means includes means selectively operated according to said code signals when a new item of instruction is projected on said screen, (1) to leave said audio machine in idle condition, (2) to start said audio machine as said item is projected, or (3) to start said audio machine responsive to the operation of said pupil's response means.

5. In a teaching machine: the combination of a pupil information screen, a supply of picture frames bearing items of instruction, a projector for projecting said items of instruction from said frames onto said screen, said frames having code areas for projecting coded light signals according to a binary code, a pupil's response screen on the back face of which background information is projected by said projector from said frames to provide a choice to the pupil for each item of instruction shown, said response screen being provided on the top face thereof with a pattern of transparent conductive areas in predetermined spatial relation to said background information, a manual conductive pointer to be touched to said pupil's response screen in making said choice, means responsive to said coded light signals when a frame is being shown for activating a conductive area overlying said choice, and circuit means responsive to a pupil touching said pointer to an activated conductive area for starting said projector to show a next successive item of instruction.

6. In a teaching machine system for presenting successive items of a set course of instruction upon the pupil making a predetermined choice as to each item: the combination of a pupils' information screen, a supply of picture frames representing said successive items of instruction, a projector operable in different modes for showing a frame for still viewing or a series of frames in a motion picture run, an audio machine having a prerecorded record medium for playing audio messages relating to selected items of instruction, a pupil's response means for activating said projector to make the next successive presentation only when the pupil has made said predetermined choice, and code means on said picture frames for providing code signals to determine said mode of operation of the projector and for determining when said audio machine is operated.

7. In a teaching machine: the combination of a pupil's information screen, a film strip having a series of picture frames bearing items of instruction, a projector for projecting said items from said frames onto said screen, said frames having code areas for projecting coded light signals according to a binary code, means controlled by the coded light signals on said picture frames to advance said film strip by a single frame for still viewing thereof or to advance said film strip by a series of frames in a motion picture run, the last frame of said series of frames having thereon a special stop code, means responsive to said special stop code for stopping said projector at the end of said motion picture run, and means operated by said projector as the same is stopped by said special stop code for advancing the projector thereupon by a single frame.

8. In a teaching machine: the combination of a pupil's viewing screen, a supply of picture frames bearing respective items of instruction, a projector for projecting said items of instruction from said frames onto said screen, an audio machine having a prerecorded record medium for playing audio messages relating to the respective items of instruction, a pupil's response means selectively operable to enable the pupil to make a choice relative to the item of instruction shown, means to cause the audio machine to be operated before the pupil's response, a repeat audio machine operated from a start position to record the audio massage from said first stated audio machine as the latter is operated, and timing means to activate said repeat audio machine to play back said audio message if the pupil delays a predetermined interval in making said choice.

9. The teaching machine set forth in claim 8, including means to return said repeat machine to said start position, and means operative only when said repeat machine is in start position to activate said projector to advance to a next frame.

10. The teaching machine set forth in claim 9, including means operative upon the pupil making said choice to return the repeat machine to said start position if it is not already there when said choice is made and to thereupon activate said projector to advance to a next frame.

11. The teaching machine set forth in claim 9 including means to reset and restart said timing means upon each return of said repeat machine to start position.

12. The teaching machine set forth in claim 9 wherein said prerecorded record medium bears a sub-audio control signal after each audio message, and means responsive to pickup of said control signal for stopping the audio machine and for returning the repeat machine to start position.

13. In a teaching machine: the combination of a pupil's viewing screen, a supply of picture frames bearing respective items of instruction, a projector for projecting said items of instruction from said frames onto said screen, an audio machine having a prerecorded record medium for playing audio messages relating to the respective items of instruction, a pupil's response means selectively operable to enable the pupil to make a predetermined choice relative to each item of instruction shown, means to cause the audio machine to be started by operation of the pupil's response means in making said predetermined choice, said prerecorded record medium bearing a sub-audio control signal after each audio message, and means responsive to pickup of said control signal for stopping the audio machine and advancing the projector by one frame.

14. In a teaching machine: the combination of a pupil's viewing screen, a supply of picture frames bearing respective items of instruction, a projector for projecting said items of instruction from said frames onto said screen, an audio machine having a prerecorded record medium for playing audio messages relating to the respective items of instruction, a pupil's response means selectively operable to enable the pupil to make a choice relative to each item of instruction shown, means for placing the machine in a mode to cause the projector to advance through a series of frames in a single run to depict motion, means for simultaneously operating said audio machine to provide an audio message during said run, a special stop code on the frame at the end of said run, means responsive to pick up of said stop code to stop the projectors, a control signal on said prerecorded record medium at the end of said audio message for stopping the audio machine, and mean rendered operative by the audio machine and the projector when both are stopped after the chine and the projector when both are stopped after the projector has completed a motion picture run for advancing the projector by a single frame.

15. In a teaching machine: the combination of a pupil's viewing screen, a projector, a supply of frames to be projected successively on said screen to show items of instruction, said frames being in groups comprising respective lessons of which the last frame of each group is provided with a special code each different from the other, an audio machine having a prerecorded record medium for playing audio messages related to said items of instruction, said record medium bearing a stop control signal at the end of each lesson, a manual scan control presettable to select any of said lessons, a scan start switch for both said projector and audio machine, means responsive to said special codes for stopping said projector at the setting of said scan control, and means responsive to said stop control signals for stopping said audio machine at the setting of said scan control.

16. The teaching machine set forth in claim 15 including means operative when both said projector and audio machine are stopped to advance the projector by a single frame.

17. The teaching machine set forth in claim 15 wherein said control signals at the ends of the lessons recorded on said record medium are all identical, including a ring counter having a series of terminals activated successively by pick up of the successive control signals during a scan run, and said scan control including a manual control switch settable at said respective terminals for stopping the audio machine when the terminal at the setting of said switch is activated.

18. In a teaching machine: the combination of a pupil's viewing screen, a projector, a supply of frames to be projected successively on said screen to show items of instruction, said frames being in groups comprising respective lessons of which the last frame of each group is provided with a special code each different from the other, an audio machine having a prerecorded record medium for playing audio messages related to said items of instruction, said record medium bearing a stop control signal at the end of each lesson, means for advancing said projector and audio machine to any selected lesson, a pupil's response means selectively operable to enable the pupil to make a predetermined choice relative to the items shown, means to advance projector and audio machine after each pupil's response, a lesson repeat timer set in operation at the showing of each item of instruction, means rendered operative by said timer upon the pupil delaying a predetermined interval in making a said choice for starting said projector and audio machine in reverse directions, means operative when said projector is reversed to the point where the last previous special code is received for stopping the projector, means operative when said audio machine is reversed until the last previous stop signal is picked up for stopping said audio machine, and means operative when the reverse drive of both the projector and audio machine is stopped for advancing the projector by one frame and for returning the audio machine into a playback condition.

19. The teaching machine set forth in claim 18 including an error counter activated each time the pupil operates said response means without making said predetermined choice, means rendered operative by said error counter when a predetermined number of errors are counted for starting said projctor and audio machine in reverse directions to return the same to the start of the lesson then underway, and means responsive to the pupil making said predetermined choice as to the item of instruction shown for resetting said error counter.

References Cited

UNITED STATES PATENTS

| | | | |
|---|---|---|---|
| 3,123,920 | 3/1964 | Crowder et al. | 35—9 |
| 3,126,646 | 3/1964 | Penraat et al. | 35—9 |
| 3,137,948 | 6/1964 | Wyckoff | 35—9 |
| 3,141,243 | 7/1964 | Chapman et al. | 35—9 |
| 3,273,260 | 9/1966 | Walker | 35—9 |
| 3,344,534 | 10/1967 | Anschutz et al. | 35—9 |
| 3,363,330 | 1/1968 | Kobler | 35—9 |
| 3,382,588 | 5/1968 | Serrell et al. | 35—9 |
| 3,383,781 | 5/1968 | Diuzet | 35—9 |
| 3,395,464 | 8/1968 | Leslie et al. | 35—9 |
| 3,401,470 | 9/1968 | Gaven | 35—9 |

EUGENE R. CAPOZIO, Primary Examiner

WILLIAM H. GRIEB, Assistant Examiner

U.S. Cl. X.R.

35—6